United States Patent [19]

Kallin et al.

[11] Patent Number: 4,729,311

[45] Date of Patent: Mar. 8, 1988

[54] PRINTING APPARATUS INCLUDING A SINGLE REVOLUTION CLUTCH

[75] Inventors: Fredrik L. N. Kallin; David G. Lant, both of Kitchener, Canada

[73] Assignee: NCR Corporation, Dayton, Ohio

[21] Appl. No.: 939,502

[22] Filed: Dec. 8, 1986

[51] Int. Cl.⁴ .............................................. B41F 13/22
[52] U.S. Cl. .................................. 101/232; 192/84 P; 192/0.02 R; 101/235; 101/245
[58] Field of Search ............... 101/232, 233, 234, 235, 101/245; 192/0.02 R, 0.02 C, 0.03, 31, 41 R, 41 S, 45, 82 R, 84 P, 89 A, 89 QT, 90, 139

[56] References Cited

U.S. PATENT DOCUMENTS

| | | | |
|---|---|---|---|
| 665,193 | 1/1901 | Dexter. | |
| 672,702 | 4/1901 | Dexter. | |
| 690,703 | 1/1902 | Dexter. | |
| 1,491,130 | 10/1920 | Chisholm. | |
| 2,083,936 | 7/1935 | Backhouse | 192/126 |
| 2,298,368 | 6/1935 | Goebel et al. | 209/88 |
| 2,331,251 | 8/1941 | Van Tuyl | 101/322 |
| 2,566,261 | 8/1951 | Torkelson | 192/0.02 C |
| 2,573,022 | 10/1951 | Homan | 192/0.02 C |
| 2,633,957 | 4/1953 | Gardinor et al. | 192/0.02 C |
| 2,756,672 | 11/1952 | George | 101/144 |
| 3,258,092 | 6/1966 | Schiebeler | 192/84 P |
| 3,309,933 | 5/1967 | Pastor et al. | 74/125 |
| 3,354,995 | 11/1967 | Morris | 192/41 |
| 3,612,677 | 10/1971 | Langdon | 101/246 |
| 3,680,402 | 8/1972 | Hoffman | 74/125 |
| 3,854,560 | 12/1974 | Nishikawa et al. | 192/27 |
| 3,921,523 | 11/1975 | Jahme | 101/232 |
| 4,215,588 | 8/1980 | Komori et al. | 74/113 |
| 4,399,750 | 8/1983 | O'Brien | 101/235 |
| 4,584,890 | 4/1986 | Chevrollier | 192/0.03 |
| 4,586,813 | 5/1986 | Ide | 355/50 |
| 4,596,185 | 6/1986 | Enter | 101/235 |

Primary Examiner—E. H. Eickholt
Attorney, Agent, or Firm—Wilbert Hawk, Jr.; Albert L. Sessler, Jr.; Elmer Wargo

[57] ABSTRACT

A printing apparatus which includes a single revolution clutch. The clutch includes first and second cam sections which comprise the output member of the clutch. When the clutch is released, a spring accelerates the output member to bring a control surface on the second cam section into operative engagement with a cylindrically-shaped, rotating, input member. An abutment member on the first cam section cooperates with a follower arm to stop the rotation of the output member after a single revolution. A solenoid and linkage are used to raise the follower above the abutment stop to release the clutch for another single revolution of the output member.

18 Claims, 5 Drawing Figures

PRINTING APPARATUS INCLUDING A SINGLE REVOLUTION CLUTCH

BACKGROUND OF THE INVENTION

This invention relates to a printing apparatus which includes a single revolution clutch.

Wrap-spring clutches are often used in printing environments which require a single revolution of the output member of the clutch to effect printing on a document. For example, in a financial data processing environment, endorsing machines utilize a wrap-spring clutch to rotate a printing member for a single revolution to effect "endorsement" printing on a document like a check. One of the problems with the wrap-spring clutches is that they do not have a long, useful life when placed in an environment requiring a high number of actuations or cycles per minute.

SUMMARY OF THE INVENTION

In one aspect of this invention, the invention relates to printing apparatus which includes: a frame; an input shaft and an output shaft rotatably mounted in said frame; an input member secured to a first end of said input shaft to rotate therewith; means for rotating said input shaft at a constant velocity; an output member secured to a first end of said output shaft to rotate therewith and also having first and second cam sections thereon; said first cam section having an abutment stop thereon; a printing member secured to the second end of said output shaft to rotate therewith; a back-up member secured to the second end of said input shaft to rotate therewith, said printing member and said back-up member being aligned in printing relationship with each other; actuation means mounted on said frame for movement between stopping and releasing positions relative to said output member; said actuation means having a follower member which coacts with said abutment stop on said first cam section to stop the rotation of said output member in a stopped position when said actuation means is in said stopping position; said second cam section having first and second control surfaces thereon, with said first control surface of said second cam section being uncoupled from said input member when said actuation means is in said stopped position; resilient means for accelerating said output member from said stopped position to an engaging position where said second control surface of said second cam member engages said input member to thereby rotate said output member and said printing member to effect printing on a document inserted between said printing member and said back-up member; and control means including an actuator for moving said actuation means between said stopping and releasing positions.

In another aspect of the invention, the invention relates to a single revolution clutch which includes a frame; an input shaft and an output shaft rotatably mounted in said frame; an input member secured to said input shaft to rotate therewith; an output member secured to said output shaft to rotate therewith and also having first and second cam sections thereon; said first cam section having an abutment stop thereon; actuation means mounted on said frame for movement between stopping and releasing positions relative to said output member; said actuation means having a follower member which coacts with said abutment stop on said first cam section to stop the rotation of said output member in a stopped position when said actuation means is in said stopping position; said second cam section having first and second control surfaces thereon, with said first control surface of said second cam section being uncoupled from said input member when said output member is in said stopped position; resilient means for accelerating said output member from said stopped position to an engaging position where said second control surface of said second cam member engages said input member to thereby rotate said output member when said input shaft is rotated; and means for moving said actuation means between said stopping and releasing positions.

The apparatus and single revolution clutch of this invention are simple and inexpensive to construct. The single-revolution clutch is designed to minimize the wear and tear thereon when it is placed in an environment requiring a high number of repetitive cycles per unit of time.

These advantages and others will become more readily understood in connection with the following description, claims, and drawing.

DETAILED DESCRIPTION OF THE INVENTION

Figure 1:
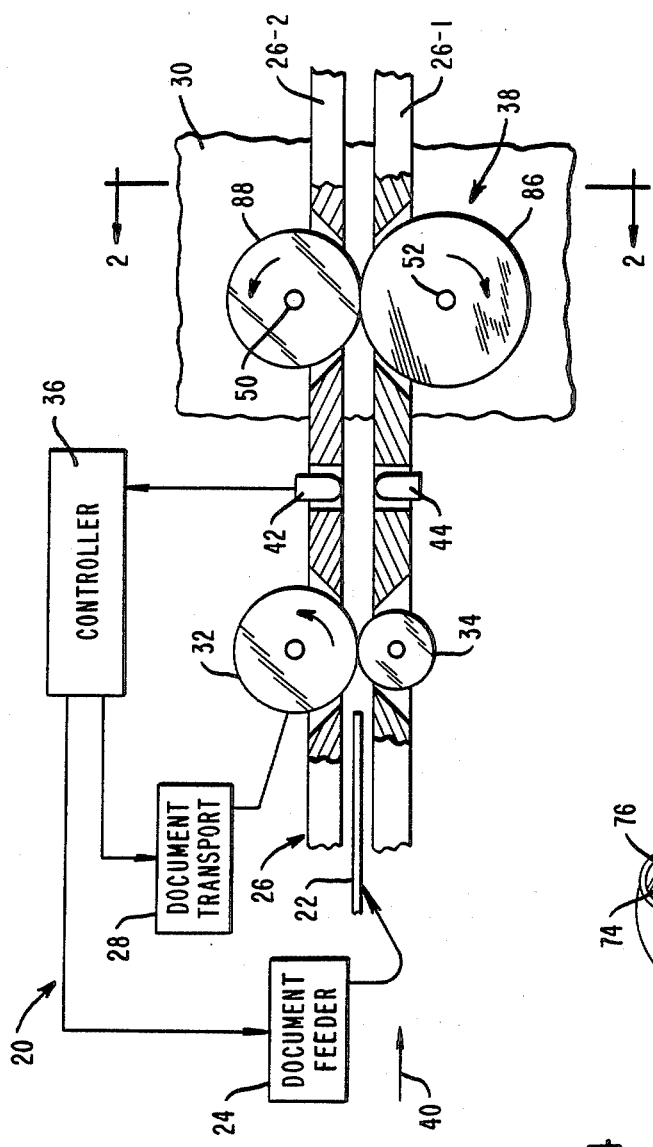
FIG. 1 is a plan view, in diagrammatic form, of a preferred embodiment of the printing apparatus of this invention.

FIG. 1 is a plan view, in diagrammatic form, of a preferred embodiment of the apparatus of this invention which is designated generally as 20. The apparatus 20 selected to portray this invention is a business machine like an endorser. In general, an endorser is a machine which is used by financial institutions to print certain data on documents, like checks.

Documents, like 22, to be processed by the apparatus 20, are conventionally fed from a stack by a feeding means which includes the document feeder 24 as shown in FIG. 1. The document feeder 24 feeds the documents 22 serially, in spaced relation, in the document track 26, and this feeding is continued by the document transport 28 which moves the documents, like 22, along the document track 26. The document track 26 is comprised of first and second sides 26-1 and 26-2, respectively, which are upstanding from and perpendicular to the base plate 30 which acts as a frame for the apparatus 20. The document transport 28 is conventional and is shown only as a drive roller 32 and an associated pinch roller 34. The drive roller 32 is rotated in a counterclockwise direction, as viewed in FIG. 1, to feed the documents 22 towards the right as viewed therein. The document feeder 24 and the document transport 28 are conventionally controlled by the controller 36 to move the documents 22 along the document track on their long, lower edges, with the top long edge of document 22 being shown in FIG. 1.

The apparatus 20 also includes a printing station designated generally as 38. The printing which is effected at the printing station 38 includes a bank endorsement made on the front of a document 22 in the embodiment described, although endorsements are often made on the rear of a document. In the embodiment described, the side of the document 22 which is adjacent to the first side 26-1 of the document track 26 is the front of the document 22 and the side of the document which faces the second side 26-2 of the document track 26 is the rear of the document 22.

As a document 22 approaches the printing station 38 (FIG. 1) from the feeding direction shown by arrow 40, the leading edge of the document 22 is detected by a sensor 42 which cooperates with a light source 44 to produce an output signal to the controller 36. This output signal is used by the controller 36 to initiate the start of printing at the printing station 38 by energizing a solenoid 46 (FIG. 3). However, before discussing the printing operations, it appears appropriate to discuss a clutch 48 (FIG. 2) which is actuated by the solenoid 46.

Figure 2:
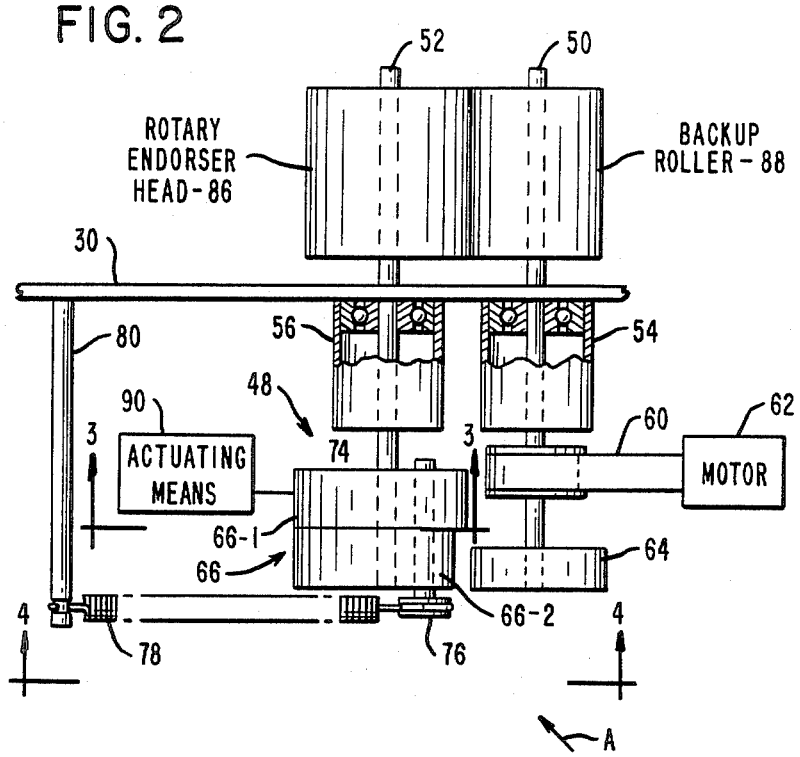
FIG. 2 is a view in elevation, taken along the general line 2—2 of FIG. 1, to show details of a single revolution clutch utilized in the printing apparatus shown in FIG. 1.
Figure 3:
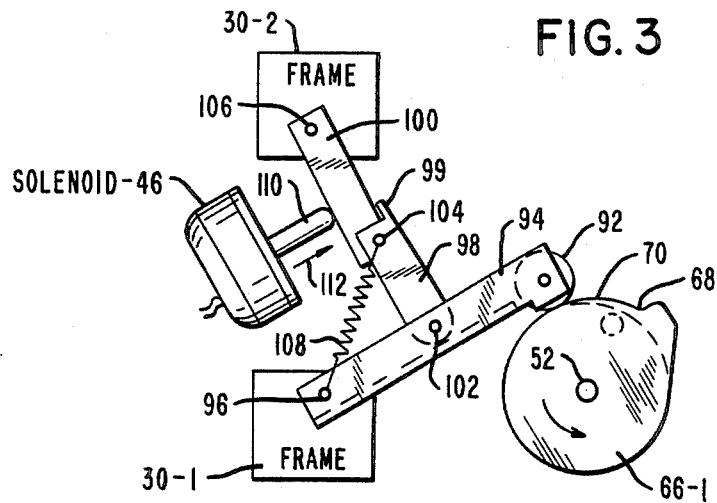
FIG. 3 is a view, taken along the general line 3—3 of FIG. 2, to show more details of the clutch shown in FIG. 2.

The clutch 48, which is shown principally in FIGS. 2-5, is essentially a single-revolution clutch. The clutch 48 includes the input shaft 50 and the output shaft 52, with input shaft 50 being rotatably mounted in a bearing 54 secured to the base plate 30, and with the output shaft 52 similarly being mounted in a bearing 56 which is also secured to the base plate 30. The input shaft 50 has a drive pulley 58 fixed thereto as shown in FIG. 2. A driving belt 60 which is coupled to the motor 62 (shown only schematically in FIG. 2) is used to rotate the input shaft 50 at a constant, rotational velocity. The input shaft 50 also has an input member 64 secured to one end thereof to rotate therewith. The input member 64 is cylindrically shaped, and it provides the rotating input to the clutch 48.

The clutch 48 also includes the output member designated generally as 66 which is secured to the output shaft 52 to rotate it whenever the clutch 48 is energized or actuated. The output member 66 includes a first cam section 66-1 and a second cam section 66-2. The first cam section 66-1 is generally cylindrically shaped, having the profile shown in FIG. 3. Notice that the first cam section 66-1 has an abutment stop 68 thereon, with a rise or up-ramp portion 70 to leading up to the abutment stop 68 when the cam section 66-1 is rotated in a counterclockwise direction as viewed in FIG. 3.

Figure 4:
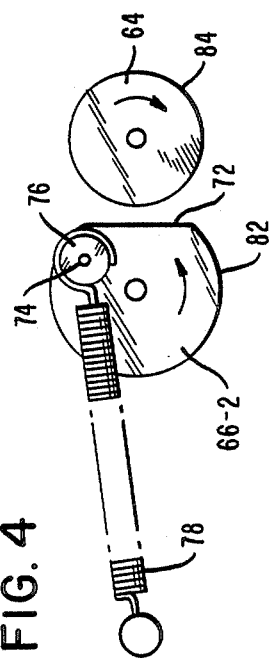
FIG. 4 is a view, taken along the general line 4—4 of FIG. 2, to show additional details of the clutch shown in FIG. 2.

The output member 66 of the clutch 48 includes the second cam section 66-2 which is also cylindrically shaped, having the profile shown in FIG. 4. The second cam section 66-2 has a control surface or flat area 72 thereon to provide a clearance between the second cam section 66-2 and the input member 64 (as shown in FIG. 4) when the clutch 48 is in a stopped position or state with regard to the output member 66. In the embodiment described, the first and second cam sections 66-1 and 66-2 are fixed to the shaft 52 and fixed to each other to rotate together by a friction pin 74. The pin 74 protrudes from the output member 66 (as shown in FIG. 2) to rotatably support a bearing 76 as shown in FIGS. 2 and 4. One end of a tension spring 78 is coupled to the bearing 76, and the remaining end of the spring 78 is coupled to a post 80 which is secured to the base plate 30. The spring 78 is used to accelerate the output member 66 of the clutch 48 from the stopped position shown in FIG. 4 to a position at which the control surface 82 engages the input member 64 to cause the second cam section 66-2 and the output member 66 to be rotated at a controlled rate of speed or rotation in the counterclockwise direction shown. In the embodiment described, the first and second cam sections 66-1 and 66-2 are made of hard rubber material, and the input member 64 is made of steel with the control surface 84 thereof being sandblasted to provide non-slipping contact between the control surface 82 of the second cam section 66-2 and the input member 64. The edges 67 and 69 (FIG. 5) of the second cam section 66-2 are chamfered to facilitate engagement and disengagement with the input member 64.

When the output member 66 is rotated as described, it rotates the output shaft 52 and the rotary endorser head 86 in the clockwise direction shown in FIG. 1. The apparatus 20 also includes the back-up roller 88 which is fixed to the input shaft 50 to rotate therewith. The back-up roller 88 rotates constantly at a fixed rotational velocity and the rotary endorser head 86 is stationary except when a document 22 is to be endorsed as determined by the controller 36. For those situations in which a document 22 is not to be endorsed, the document can be fed through the printing station 38 even though the rotary endorser head 86 is held stationary; this is because the back-up roller 88 rotates all the time. There are additional feed or drive rollers (not shown but like drive roller 32) to move the documents 22 in a downstream direction from the printing station 38.

Figure 5:
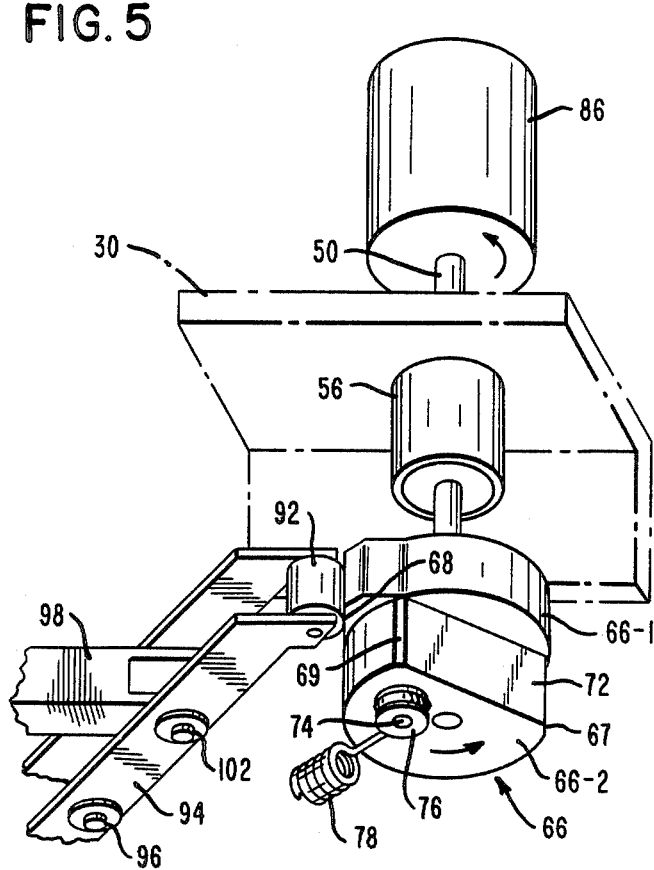
FIG. 5 is a general, perspective view, taken from the general direction of arrow A of FIG. 2, to show additional details of the clutch shown in FIG. 2.

The apparatus 20 also includes an actuation means 90, shown schematically in FIG. 2, for moving the clutch between stopping and releasing positions with regard to the output member 66. The actuation means 90 includes the follower member or roller 92 shown in FIGS. 3 and 5. The roller 92 is rotatably supported on an end of a follower arm 94, and the other end of the follower arm 94 is pivotally secured to the frame of the apparatus (shown schematically as 30-1 in FIG. 3) by a pin 96. The actuator means 90 also includes a link means for providing an over-the-center position shown in FIG. 3, with this link means including links 98 and 100. Link 98 has one end pivotally secured to the follower arm 94 by a pin 102, and the remaining end thereof is secured to one end of the link 100 by a pin 104. The remaining end of the link 100 is secured to the frame 30-2 by a pin 106. A tension spring 108, whose ends are secured to the pins 96 and 104, is used to bias the links 98 and 100 to the over-the-center position shown in FIG. 3. The link 98 has an extension 99 (FIG. 3) which cooperates with the link 100 to limit the pivoting movement of link 100 in a clockwise direction about pin 106 as viewed in FIG. 3. From this position, the roller 92 rides up the up-ramp portion 70 of the first cam section 66-1 to decelerate the output member 66 and bring it to a stop when the follower wheel 92 abuts against the abutment stop 68 as shown in FIG. 5. A feature of the apparatus 20 is that the output member 66 is decelerated by rolling friction between the follower roller 92 and the up-ramp portion 70. The inertia of the output member 66 and the endorser head 86 also assist in moving the links 98 and 100 to the over-the-center position shown in FIG. 3.

When the clutch 48 is to be actuated or "released", the solenoid 46 (FIG. 3) is energized by the controller 36 to start the action. The plunger 110 of the solenoid 46 then pushes the links 98 and 100 over the dead center position by moving in the direction of arrow 112, causing the follower roller 92 to be pulled away from the abutment stop 68. When the follower roller 92 is clear of the abutment stop 68, the tension spring 78 (FIG. 4) accelerates the output member 66 in a counterclockwise direction to bring the control surface 82 into driving engagement with the rotating input member 64 as previously described. As the rotary endorser 86 is rotated, an endorsing rotary plate (not shown) positioned on the rotary endorser head 86 is rotated into an operative position with the back-up roller 88 to print the endorsement on a document 22 passing therebetween. After the first cam section 66-1 is rotated in a counterclockwise direction (as viewed in FIG. 3) after energization of the solenoid 46, the abutment stop 68 passes under the follower roller 92. Thereafter, the solenoid 46 is deenergized by the controller 36, permitting the follower roller 92 to ride on the first cam section 66-1 to put the clutch 48 into the stopping position shown in FIG. 3. The stopped position of the clutch 48 after a single revolution, is shown in FIG. 5.

In the embodiment described, the diameter of the input roller 64 and the diameter of the back-up roller 88 are identical. Similarly, the diameter of the second cam section 66-2 and the diameter of the rotary endorser head 86 are identical. This enables the rotary endorser head 86 and the back-up roller 88 move a document 22 passing therebetween with the same tangential velocity even though the diameters of the rotary endorser head 86 and the back-up roller 88 may be different. While the apparatus 20 effects an endorsement on the front of a document 22, the apparatus 20 may be "reversed" to effect an endorsement on the rear of a document.

What is claimed is:

1. A single revolution clutch comprising:
   a frame;
   an input shaft and an output shaft rotatably mounted in said frame;
   an input member secured to said input shaft to rotate therewith;
   an output member secured to said output shaft to rotate therewith and also having first and second cam sections thereon;
   said first cam section having an abutment stop thereon;
   actuation means mounted on said frame for movement between stopping and releasing positions relative to said output member;
   said actuation means having a follower member which coacts with said abutment stop on said first cam section to stop the rotation of said output member in a stopped position when said actuation means is in said stopping position;
   said second cam section having first and second control surfaces thereon, with said first control surface of said second cam section being uncoupled from said input member when said output member is in said stopped position;
   resilient means for accelerating said output member from said stopped position to an engaging position where said second control surface of said second cam member engages said input member to thereby rotate said output member when said input shaft is rotated; and
   moving means for moving said actuation means between said stopping and releasing positions.

2. The single revolution clutch as claimed in claim 1 in which said input and output shafts are parallel to each other.

3. The single revolution clutch as claimed in claim 2 in which said first cam section also has an up-ramp portion thereon to decelerate said output member prior to said follower member contacting said abutment stop.

4. The single revolution clutch as claimed in claim 3 in which said actuation means includes a link mechanism which is coupled to said follower member and said frame to hold said output member in said stopped position when said link mechanism is moved to an over-the-center position;
   said moving means including an actuator to move said link mechanism off said over-the-center position to release said output member for rotation when said actuation means is in said releasing position.

5. The single revolution clutch as claimed in claim 4 in which said input member and said second cam section are cylindrically shaped and in which said first control surface of said second cam section is a flat area which lies between said input and output shafts when said output member is in said stopped position.

6. The single revolution clutch as claimed in claim 5 in which said resilient means includes a spring which rotates said output member from said stopped position to said engaging position.

7. The single revolution clutch as claimed in claim 6 in which one of said input member and said second cam section is made of a hard rubber material.

8. The single revolution clutch as claimed in claim 7 in which said actuation means includes a resilient member to bias said link mechanism towards said over-the-center position.

9. The single revolution clutch as claimed in claim 7 in which said first cam section is made of a hard rubber material and said follower member includes a follower wheel which rides up said up-ramp portion to provide rolling friction therebetween to decelerate said output member prior to said follower wheel of said follower member contacting said abutment stop.

10. A printing apparatus comprising:
    a frame;
    an input shaft and an output shaft rotatably mounted in said frame;
    an input member secured to a first end of said input shaft to rotate therewith;
    means for rotating said input shaft at a constant velocity;
    an output member secured to a first end of said output shaft to rotate therewith and also having first and second cam sections thereon;
    said first cam section having an abutment stop thereon;
    a printing member secured to the second end of said output shaft to rotate therewith;
    a back-up member secured to the second end of said input shaft to rotate therewith;
    said printing member and said back-up member being aligned in printing relationship with each other;
    actuation means mounted on said frame for movement between stopping and releasing positions relative to said output member; said actuation means having a follower member which coacts with said abutment stop on said first cam section to stop the rotation of said output member in a stopped position when said actuation means is in said stopping position;
    said second cam section having first and second control surfaces thereon, with said first control surface of said second cam section being uncoupled from said input member when said actuation means is in said stopped position;

resilient means for accelerating said output member from said stopped position to an engaging position where said second control surface of said second cam member engages said input member to thereby rotate said output member and said printing member to effect printing on a document inserted between said printing member and said back-up member;

control means including an actuator for moving said actuation means between said stopping and releasing positions; and moving means for moving said actuation means between said stopping and releasing positions.

11. The printing apparatus as claimed in claim 10 in which said input and output shafts are parallel to each other.

12. The printing apparatus as claimed in claim 11 in which said first cam section also has an up-ramp position thereon to decelerate said output member prior to said follower member contacting said abutment stop.

13. The printing apparatus as claimed in claim 12 in which said actuation means includes a link mechanism which is coupled to said follower member and said frame to hold said output member in said stopped position when said link mechanism is moved to an over-the-center position;

said moving means including an actuator to move said link mechanism off said over-the-center position to release said output member for rotation when said actuation means is in said releasing position.

14. The printing apparatus as claimed in claim 13 in which said input member and said second cam section are cylindrically shaped and in which said first control surface of said second cam section is a flat area which lies between said input and output shafts when said output member is in said stopped position.

15. The printing apparatus as claimed in claim 14 in which said resilient means includes a spring which rotates said output member from said stopped position to said engaging position.

16. The printing apparatus as claimed in claim 15 in which said second cam section is made of a hard rubber material and said input member is made of metal.

17. The printing apparatus as claimed in claim 16 in which said actuation means includes a resilient member to bias said link mechanism towards said over-the-counter position.

18. The printing apparatus as claimed in claim 17 in which said first cam section is made of a hard rubber material and said follower member includes a follower wheel which rides up said up-ramp portion to provide rolling friction therebetween to decelerate said output member prior to said follower wheel of said follower member contacting said abutment stop.

* * * * *